Dec. 21, 1948.  W. F. BOLLING  2,456,858
COMBINATION KNIFE, FORK, AND SPOON
Filed July 29, 1946
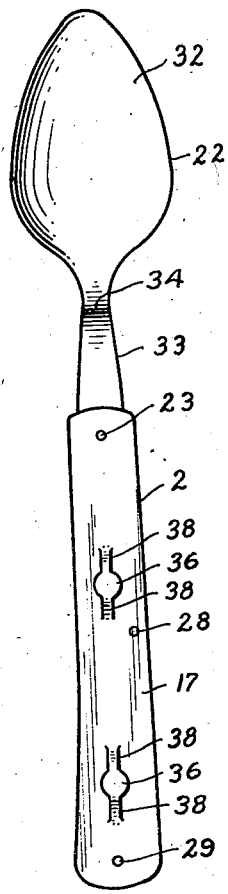
Fig. 2.
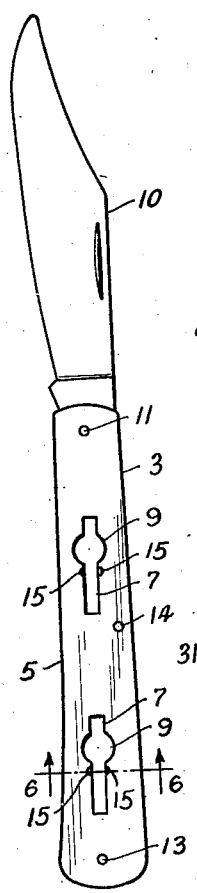
Fig. 3.
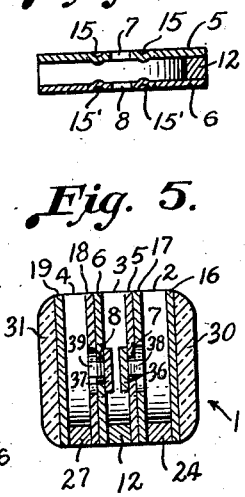
Fig. 6.
Fig. 5.
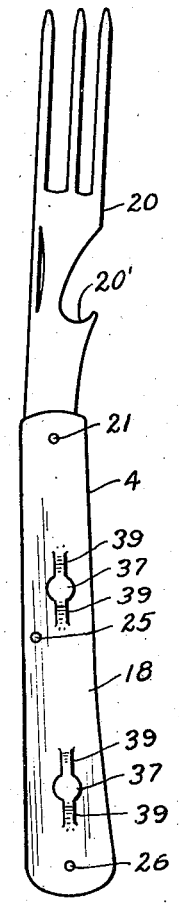
Fig. 4.
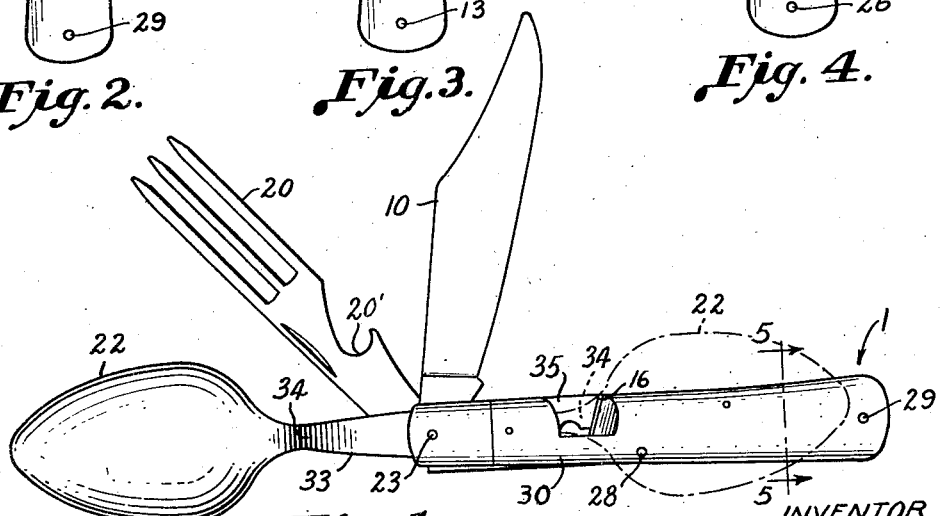
Fig. 1.
INVENTOR
WILLIAM F. BOLLING,
BY Almon S. Nelson
ATTORNEY Patented Dec. 21, 1948

2,456,858

UNITED STATES PATENT OFFICE 2,456,858

COMBINATION KNIFE, FORK, AND SPOON

William F. Bolling, Norton, Va.

Application July 29, 1946, Serial No. 686,819

3 Claims. (Cl. 30—143)

This invention relates to certain new and useful improvements in combination table ware, and, more particularly, the invention relates to a combined, knife, fork and spoon.

One object of the invention is to provide an article which will carry a knife blade, fork and spoon normally in folded relation and attached together in a convenient handle, the handle being made in separable parts so that the knife, fork and spoon may be used separately when desired.

Another object of the invention is to provide means for securely locking the separable parts of the handle together.

Another object of the invention is to provide an article of the aforementioned type in which any one of the fork, knife or spoon, may be used, when desired, without separating the parts of the handle.

A further object of the invention is to provide a handle structure having a curved blade, such as a spoon, pivotally connected thereto, wherein the curved blade may be folded relative to the handle to form a compact structure.

Other objects and advantages of the invention will become apparent as the description proceeds, reference being made to the accompanying drawing, wherein:

Fig. 1 is a side elevational view of my combined knife, fork and spoon with the handle in assembled relation, and with the spoon blade in fully opened position and the knife and fork blades in partially opened positions, Fig. 2 is a plan view of the spoon blade and its handle, Fig. 3 is a side elevational view of the knife blade and its handle, Fig. 4 is a plan view of the fork blade and its handle, Fig. 5 is a sectional view taken along the line 5—5 of Fig. 1 looking in the direction of the arrows, and Fig. 6 is an enlarged sectional view of a detail taken along the line 6—6 of Fig. 3 looking in the direction of the arrows.

Referring now to the drawings, the main handle, designated generally by the reference numeral 1, comprises a spoon handle 2, a knife handle 3 and a fork handle 4.

The knife handle 3 comprises spaced plates 5 and 6 which are provided with spaced, longitudinally extending slots 7 and 8, respectively. The slots 7 and 8 are provided with enlargements, constituting eyes 9 which are adapted to receive heads to be later described.

At one extremity of the handle 3 a knife blade 10 is pivoted upon a suitable pin 11. Preferably, a combined spacing member and spring 12 is provided to space the plates 5 and 6 and to cooperate with the blade so as to hold the same in an open or closed position in a manner well known in pocket knives.

The combined spacing member and spring 12 is located between the plates 5 and 6 along one of the edges and the butt ends thereof and the plates are suitably held in spaced relation by means of the pin 11, and also pins 13 and 14 which project through the butt ends and substantially midway between the ends, respectively, of the plates 5 and 6 and the member 12. The free end of the member 12 thus functions as a spring in the usual manner well known in pocket knife construction.

Inwardly directed projections 15 and 15' are provided adjacent the edges of the slots 7 and 8, respectively, of the plates 5 and 6, and adjacent the enlargements or eyes 9. These projections 15 and 15' extend inwardly approximately 1/64 of an inch and provide friction locking means which will be more fully described later.

The handles 2 and 4 are similarly constructed for the most part and comprise spaced plates 16, 17 and 18, 19, respectively. At one extremity of the plates 16 and 17 a fork blade 20, provided with a bottle opener recess 20', is pivotally mounted upon a suitable pin 21. Similarly, at one extremity of the plates 18 and 19 a curved blade in the form of a spoon 22 is pivotally mounted upon a suitable pin 23.

A combined spacing member and spring 24 is provided between the plates 16 and 17 of the handle 2 along one of the edges and the butt ends thereof and these plates 16 and 17 are suitably held in spaced relation by means of the pin 21, and also pins 25 and 26 which project through substantially midway between the ends and through the butt ends, respectively, of the plates 16 and 17 and the member 24.

A combined spacing member and spring 27 is provided between the plates 18 and 19 of the handle 4 and these plates 18 and 19 are maintained in spaced relation by means of the pin 23, and also the pins 28 and 29 which project through substantially midway between the ends and through the butt ends, respectively, of the plates 18 and 19 and member 27.

The free ends of the members 24 and 27 cooperate with the blades 22 and 20, respectively, so as to hold the same in open or closed positions in the manner well known in pocket knife construction.

The manner of spacing the plates 5, 6, the plates 16, 17 and the plates 18, 19 is common in pocket knife construction and hence need not be further described.

Facing strips 30 and 31 of bone or similar material may be provided in a well known manner on the outside faces of the plates 16 and 19, respectively, if desired.

The spoon blade 22 comprises the usual bowl 32 and a relatively short handle 33 connected together by a curved portion 34 in the usual manner. Thus the spoon blade 22 is a curved blade and in order to provide for the folding thereof, a slot 35 (Fig. 1) is provided in the plate 16 and the facing strip 30 to receive the curved portion thereof. Thus, when the spoon is folded, the handle portion 33 lies between the plates 16 and 17 and the curved portion 34 extends outwardly through the slot 35, with the bowl 32 of the spoon lying along the side of the facing strip 30 and inwardly directed with respect thereto, as shown in the dot and dash line in Fig. 1.

The knife blade 10 is adapted to be folded into the space between the plates 5 and 6 in the manner usual with pocket knives and likewise the fork 20 is adapted to fold into the space between plates 18 and 19.

The three separable handles 2, 3 and 4 are adapted to be attached together so as to form the single handle 1, having as it were, three blades, one of which is the spoon blade 22, another the knife blade 10, and the other the fork blade 20. In order to bring about this arrangement, the inside plate 17 of the spoon handle and the inside plate 18 of the fork handle are provided, at points corresponding to the enlargements 9 of the slots 7 and 8, with suitable heads 36 and 37, respectively. The heads 36 and 37 are preferably substantially circular, and to form these heads the material in the plates 17 and 18 may be forced outwardly in a suitable stamping press. Each of the circular heads 36 and 37 is connected with the body of the plates 17 and 18, respectively, by means of inclined tongues 38 and 39, respectively.

The diameters of the heads 36 and 37 are such that they may pass easily through the eyes or openings 9 and the tongues 38 and 39 are of reduced width so that they may be received or positioned in the slots 7 and 8, respectively.

The heads 36 and 37 are offset sufficiently from the bodies of the plates 17 and 18, respectively, to enable the heads 36 and 37 to pass completely through the enlargements 9 when the three handles are set together in the manner illustrated in Figs. 1 and 5.

With the heads 36 of the spoon handle 2 received near the inner face of the plate 5, the spoon handle 2 is forced longitudinally of the knife handle 3 and toward the butt end of the device. This movement slides the heads 36 out of alignment with the eyes or enlargements 9 and over and beyond the projections 15 so that the side edges of these heads 36, between the tongues 38, project over the edges of the slots 7. The projections 15 provide a friction locking means securely locking the handles 2 and 3 together. The fork handle 4 is similarly assembled with respect to the knife handle 3, and the projections 15′ provide a friction locking means securely locking the handles 3 and 4 together.

When the handles have been put together in the manner just described, the knife blade, the fork blade and the curved spoon blade may be folded like the blades of an ordinary knife so that the complete article presents substantially the appearance of an ordinary pocket knife except for the bowl 32 of the spoon 22, which projects outwardly but lies along the side of the handle 1. It will be obvious, of course, that the blades may be folded before the three handles are assembled if desired.

When the knife, fork and spoon are all to be used, they are separated as illustrated in Figs. 2, 3, and 4. If it is desired merely to use any one of the three blades, the said blade may be opened and used without separating the handles 2, 3, and 4.

From the foregoing specification it will be obvious that I have provided a combined knife, fork and spoon, especially useful as an article to be carried by persons on outing, camping expeditions or the like, which is simple in construction, compact, and cheap to manufacture.

While the invention is susceptible of various modifications and alternative constructions, I have shown in the drawings and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim:

1. An article of the class described, comprising a handle having spaced plates each of which is provided with a plurality of longitudinally disposed slots formed therethrough, said slots having enlargements constituting eyes spaced from at least one of the ends of the slots, locking means comprising inwardly directed projections on said spaced plates adjacent the enlargements of said slots, second and third handles each having a plate provided with heads offset therefrom and adapted to pass through said eyes, said heads being connected to said last plates by means adapted to be received in said slots and slidable therein to carry the heads beyond said projections, and a blade carried by each of said handles.

2. The structure set forth in claim 1, wherein said blades comprise a knife, a fork and a spoon.

3. The structure set forth in claim 1, wherein said second handle comprises a second plate spaced from said plate provided with heads, and wherein said blade carried by said second handle is pivotally connected thereto and comprises a curved portion, said second plate having a slot therein to receive the curved portion of said blade in closed position.

WILLIAM F. BOLLING.

REFERENCES CITED

The following references are of record in the file of this patent:

UNITED STATES PATENTS

| Number | Name | Date |
|--------|------|------|
| 656,092 | Cables | Aug. 14, 1900 |
| 870,413 | Brown | Nov. 5, 1907 |
| 972,777 | Richardson | Oct. 11, 1910 |